Feb. 21, 1950   J. S. W. BERGMAN   2,498,352
FISH LURE
Filed July 5, 1947
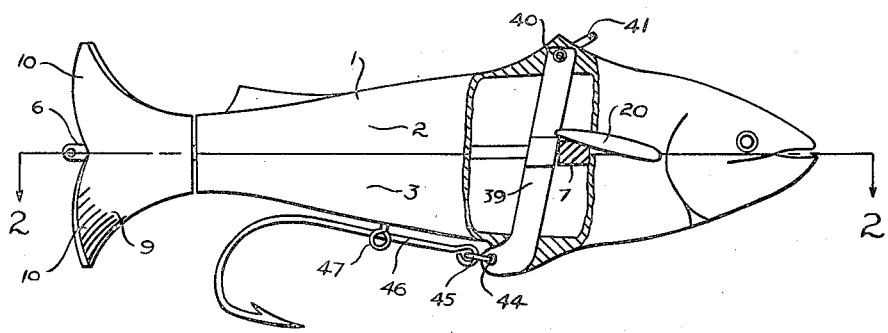
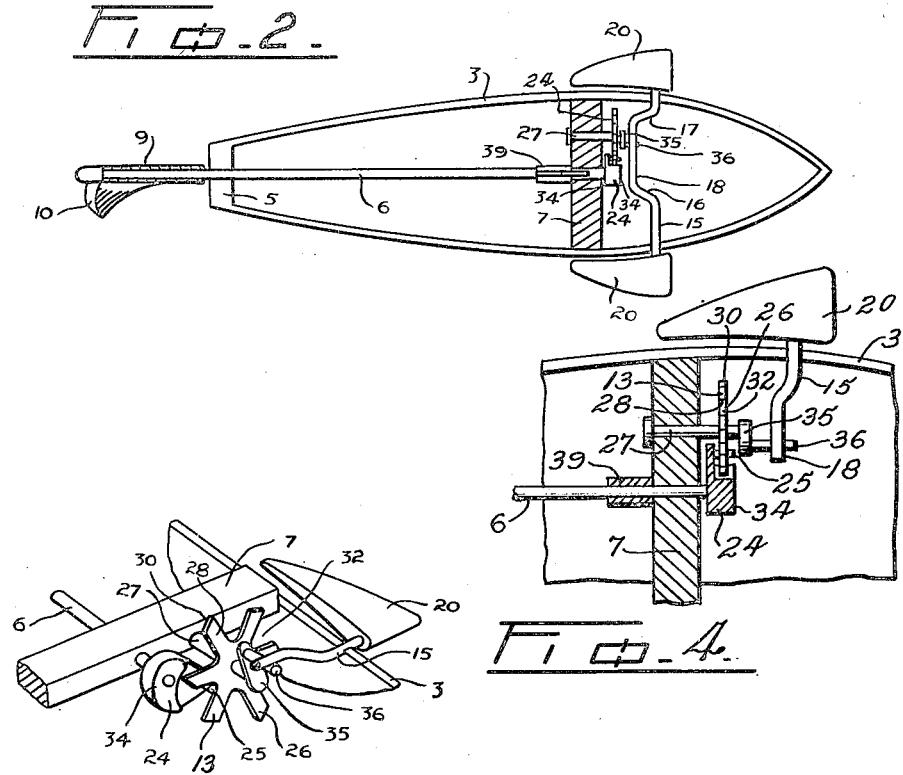
INVENTOR
JOHN SOREN WILLIAM BERGMAN
Ernest E Carver
ATTORNEY Patented Feb. 21, 1950

2,498,352

UNITED STATES PATENT OFFICE 2,498,352

FISH LURE

John Soren William Bergman, Vancouver, British Columbia, Canada

Application July 5, 1947, Serial No. 759,176

2 Claims. (Cl. 43—42.01)

My invention relates to improvements in fish lures. The object of the invention is to provide a lure which is in the form of a live fish and which is provided with a mechanical movement operated in response to the movement of the lure through the water to cause some of the fins to oscillate, whereby the lure will not only travel along a horizontal plane but will dive at intervals simulating somewhat closely the action of a live fish.

The invention contemplates a lure in the form of a live bait having a rotatable tail and means operated by the tail for moving the fins or other similar parts of the lure to change the direction of travel of the lure when drawn through the water.

Referring to the drawings:

Fig. 1 is an elevational view of the invention showing parts in section.

Fig. 2 is a view partly in section taken on the line 2—2 of Figure 1.

Fig. 3 is a fractional perspective detail view of the movement shown in Figure 2.

Figure 4 is an enlarged horizontal section view of the movement shown in Figure 3.

In the drawings like characters of reference indicate corresponding parts in each figure.

The numeral 1 indicates generally a hollow body representing a fish or other suitable live bait, which body is for the purpose of manufacture, divided into upper and lower sections 2 and 3 respectively.

The example shown is preferably moulded of plastic material and is suitably coloured to give the appearance of a live fish.

Each of the sections 2 and 3 is provided with an end wall 5 which jointly seal off the body at the rear and form a journal for a tail shaft 6. The lower section 3 is provided with a transverse member 7 in which the forward end of said tail shaft is journalled.

The tail shaft 6 is provided at its rear end with a tail 9, the flukes 10 of which are curved to form a propeller and cause the tail shaft to rotate as the body 1 is drawn through the water. The forward end of the tail shaft is connected to a Geneva gear generally indicated by the numeral 13.

Journalled in the side walls of the sections 2 and 3 is a transverse shaft 15, which is offset intermediate its length as at 16 and 17 to provide a crank 18. Fins 20 are secured on the outer ends of the transverse shaft 15.

The Geneva gear 13 consists of a driver disk 24 having a driving pin 25 which engages a driven disk 26 mounted upon a counter shaft 27, which shaft is journalled in the transverse member 7. The driven disk 26 is provided with spokes 28 having tangential ends 30, each of which act as a cam and when struck by the driving pin causes the spoke to move jerkily until said pin can enter the following slot 32 defined between each pair of adjacent spokes 28. When the driving pin 25 has completed its work against the side of a spoke, the hub end 34 of the driving disk 24 will enter the following slot 32 and prevent free return movement of the driven disk 26.

I prefer to mount the driving disk 24 eccentrically upon the tail shaft 6, as by so doing, its hub end 34 causes a slight back lash or flutter to the driven disc 26 as said hub end rotates within the slots 32.

Mounted at the free end of the counter shaft 27 is a crank 35 having a crank pin 36 which is adapted to alternately engage the crank 18 of the transverse shaft 15 to which the fins 20 are secured. The throw of the crank 18 is somewhat more than twice the length of the crank pin 36, and the offset 16 to the crank 18 is so placed in the transverse shaft that on each revolution of the crank pin 36 it will raise the crank 18 and pass beyond the offset 16, thus allowing the transverse shaft 15 to swing in a reverse direction unhampered by the crank pin 36. The fins 20 swing upwardly due to the upward stroke of the crank pin 36 when being rotated by the propeller or tail 9 and swing downwardly to slightly below the horizontal after the said crank pin 36 has passed the end of the crank 18. It will be noticed that the stroke imparted to the fins is substantially 90 degrees and that it is only during the upstroke of the crank pin 36 that any swinging force is applied to the fins by the mechanical movement above described.

The upper and lower sections 2 and 3 of the hollow body 1 are coupled together by an inclined member 39 which is provided with an eye 40 for attachment to a ring 41 and a leader (not shown) and with an eye 44 at its lower end for attachment to a ring 45 and a hook 46. The hook is normally releasably retained in alignment with the body 1 by a spring clip 47.

As the device is drawn through the water each rotation of the tail 6 will cause fin flutter and once in every rotation of the driven disk 26 one complete cycle of movement of the fins will take place, the operating train giving an upward lift only to the fins as described.

What I claim as my invention is:

1. A fish lure adapted for attachment to a fish line, said lure comprising a hollow body simulating a live bait, a shaft extending longitudinally of the body having a propeller tail at one end and a crank at the opposite end, a transverse shaft journalled in the sides of said body, said shaft having fins extending beyond said body, said shaft having a crank intermediate its length, and a Geneva gear operatively interposed between the cranks of the shafts to impart a movement to the transverse shaft in one direction only, said transverse shaft being adapted to be rocked in an opposite direction by sustained pull on the fish line.

2. A fish lure adapted for trailing through the water, said lure comprising a hollow body simulating a live bait, a shaft extending longitudinally of the body having a propeller tail at one end, a Geneva gear including a driving and a driven element, said driving element being secured to said shaft and to be rotated thereby, said driven element having a crank, and a transverse shaft having a crank intermediate its length and a fin secured upon each end of said shaft, the crank of the driven element being adapted to engage one side only of the crank of the transverse shaft to impart a rocking movement thereto, said fins being urged into substantial alignment with the body in response to movement of the lure through the water.

JOHN SOREN WILLIAM BERGMAN.

REFERENCES CITED

The following references are of record in the file of this patent:

UNITED STATES PATENTS

| Number | Name | Date |
|---|---|---|
| 378,410 | Trimble | Feb. 21, 1888 |
| 638,885 | Peterson | Dec. 12, 1899 |
| 879,869 | Hansen | Feb. 25, 1908 |
| 978,290 | Heatley | Dec. 13, 1910 |
| 1,068,908 | Lane | July 29, 1913 |